United States Patent [19]

Offoiach

[11] Patent Number: 5,570,995
[45] Date of Patent: Nov. 5, 1996

[54] PACKING SYSTEM FOR ROLLING MILL STOCK BY MEANS OF AN IMPROVED SUSPENDED TRANSFER MEANS

[75] Inventor: Renzo Offoiach, Tarcento, Italy

[73] Assignee: S.I.M.A.C. S.p.A., Tarcento, Italy

[21] Appl. No.: 594,368

[22] Filed: Jan. 30, 1996

Related U.S. Application Data

[63] Continuation of Ser. No. 280,224, Jul. 25, 1994, abandoned.

[30] Foreign Application Priority Data

Aug. 19, 1993 [IT] Italy .................................. UD93A0168

[51] Int. Cl.[6] .................................................. B65G 57/18
[52] U.S. Cl. .................. 414/786; 414/788.3; 414/791.4; 414/793.2
[58] Field of Search .............................. 414/786, 788.3, 414/791.4, 793.2, 797.1

[56] References Cited

U.S. PATENT DOCUMENTS

| | | | |
|---|---|---|---|
| 4,648,770 | 3/1987 | Berz et al. | 414/793.2 X |
| 5,340,270 | 8/1994 | Castellani | 414/793.2 |

FOREIGN PATENT DOCUMENTS

| | | | |
|---|---|---|---|
| 0380766 | 8/1990 | European Pat. Off. | 414/788.3 |
| 1183020 | 12/1964 | Germany | 414/793.2 |
| 295813 | 11/1991 | Germany | 414/793.2 |

Primary Examiner—Karen Merritt
Assistant Examiner—Janice L. Krizek
Attorney, Agent, or Firm—Harrison & Egbert

[57] ABSTRACT

A process for a packing system for rolling-mill stock in which the packing system includes a continuous conveyor, an overhead transfer with a suspended electromagnet, and a lifter positioned below the conveyor in association with the overhead transfer. The process includes the steps of stopping an advancement of a first rolling-mill stock below an electromagnet collector an a multilayered rolling-mill stock below the overhead transfer, raising the first rolling-mill stock by the collector from the conveyor, lifting the multilayered rolling-mill stock toward the electromagnet, advancing a second rolling-mill stock while the overhead transfer deposits the multi-layer rolling mill stock into a packing pocket, stopping the advancement of the second rolling-mill stock below the collector, and depositing the first rolling-mill stock onto the second rolling-mill stock while the overhead transfer returns to a position above the lifter.

6 Claims, 2 Drawing Sheets

PACKING SYSTEM FOR ROLLING MILL STOCK BY MEANS OF AN IMPROVED SUSPENDED TRANSFER MEANS

This is a continuation of application Ser. No. 08/280,224 filed on Jul. 25, 1994, now abandoned.

TECHNICAL FIELD

This invention has for object a packing system for rolling-mill stock with a productivity increasing device.

BACKGROUND ART

In the present state of technology is known the necessity to pack at greater speed in an area commonly called a packing zone, metallic rolling-mill stock, (section bars, bars, plates, etc.) that come from a rolling-mill plant after being cut into a pre-determined length to form the respective packages.

The formation of rolling-mill stock packages according the to the present invention occurs by means of stratification, that by superimposed layers.

In some cases it is also necessary to alternatively overturn the respective layers to carry out self-binding of the package. For example, when angles are formed in the package (an upright and an overturned layer respectively of "n" rolling-mill stock and "n–1" rolling-mill stock).

One can also verify the formation of a package of flat rolling-mill stock of convenient width by means of the advancement of one rolling-mill stock at a time.

The present invention makes specific reference to packing systems with suspended rolling-mill stock transfer means, as described in the patent applications of "S.I.M.A.C. S.p.A., identified as U.S. patent application Ser. No. 07/919,540 and U.S. Pat. No. 5,340,270.

In particular, this patent application and patent contemplate the use of:

a continuous transporting system of rolling-mill stock transverse to their pre-determined cut length, with advancement stopping means in at least one collecting station;

transfer means of the rolling-mill stock with overhead collection with a series of suspended rotatable electromagnets, in association with lifting means that remove from below the feeding line the rolling-mill stock and lift them above the said feeding line, to supply them below or above the series of suspended electromagnets, the said series of suspended electromagnets oscillating from the collecting position above a packing zone to place the rolling-mill stock in a packing pocket.

The solution of the U.S. Pat. No. 5,340,270 is however very advantageous since the suspended transfer means never interferes below the advancement line.

These solutions however have a critical restriction of operative packing speed, deriving from mechanical co-ordination solutions between the rolling-mill stock transfer means with overhead collection and the lifting means.

The object of the present invention is to increase the productivity of the plant by means of increasing the speed of the packing phase.

SUMMARY OF THE INVENTION

The present invention, solves the problem by means of a packing system for rolling-mill stock employing a device to increase the packing speed of the type involving:

a continuous rolling-mill stock transporting system transverse to their pre-determined cut length, with advancement stopping means in at least one collecting station;

rolling-mill stock transfer means with overhead collection by means of a suspended rotatable electromagnetic system, in association with lifting means that collects the rolling-mill stock from below the feeding line and raises them above the feeding line, supplies the rolling-mill stock above or below the suspended electromagnetic means, oscillating from the said collection position above a packing zone, placing the rolling-mill stock in a packing pocket.

The present invention has, in front of the said overhead rolling-mill stock collecting means, a double layer of superimposed rolling-mill stock in the formation device. The suspended electromagnetic collection means moves upwardly while the following operation occur.

a) stopping of the advancement of a first rolling mill stock/layer of rolling-mill stock below the said double layer formation device and of a double rolling-mill stock layer below the suspended electromagnetic transfer means and above the lifting means;

b) raising of the first rolling-mill stock/layer of rolling-mill stock by electromagnetic collecting means from the said double layer formation device, while the lifting means:

raises, with the first rolling-mill stock/layer, the respective double layer of superimposed rolling-mill stock already shaped to be attached below or above the electromagnetic transfer means of rolling-mill stock with overhead collection, and thereafter lowers them below the advancement line so as not to interfere with the same;

c) advancing a second rolling-mill stock/layer of rolling-mill stock, while the said rolling-mill stock transfer means with overhead collection operates to place in the packing pocket the double layer of superimposed rolling-mill stock previously removed;

d) stopping of the advancement of the second rolling-mill stock/layer of rolling-mill stock below the said double layer formation device and deposition of the first rolling-mill stock/layer of rolling-mill stock suspended on top of the second rolling-mill stock/layer of rolling-mill stock by the double layer formation device, while the suspended electromagnetic transfer means return above the said lifting means.

The advantages obtained with this innovation result from the fact that tile bottle-neck occurring in the packing phase is eliminated, allowing the respective transfer means to transfer a double layer of rolling-mill stock while at the same time the device at the beginning provides the formation of a double layer using a double advancement of the advancement line.

In this way the speed is doubled.

These and other advantages will appear from the subsequent description of the present invention.

BRIEF DESCRIPTION OF THE DRAWINGS

FIGS. 1' to 6' represent the successive phases of a packing cycle of angulars in upright and overturned layers, in this specific case two layers of "n" upright angulars and two layers of "n–1" overturned angulars, but it is obvious that different packing combinations can also be made, this being used only as a preferential example.

DETAILED DESCRIPTION OF THE INVENTION

Figure 1:
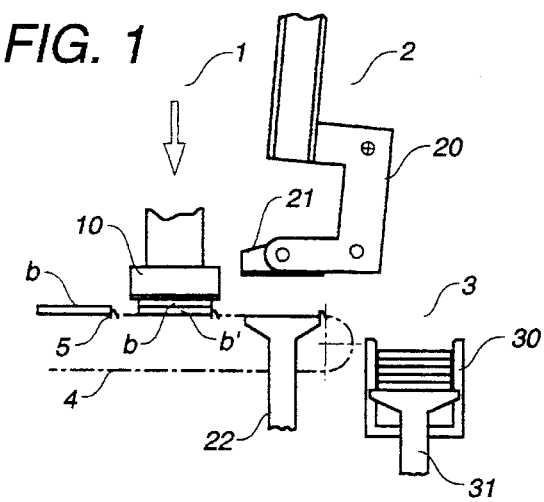
FIGS. 1 to 6 represent the successive phases of a plate packing cycle (in this specific case one plate at a time, with transfer to the packer of two plates at a time)

From the figures it is more clearly understood that the system includes:

an endless advancement line (4) (chains or belt) of transversely arranged rolling-mill stock, e.g. plates (b) or angulars (a) or any other rolling-mill stock to be packed in a packing zone (3);

a series of advancement stops (5) of rolling-mill stock:
   for the formation of one layer at a time with a pre-determined number of rolling-mill stock;
   for the formation of a double layer and
   for the collection of transfer to the packing pocket (3).

a station for forming a double layer involving a lifter of rolling-mill stock layer with a row of suspended electromagnets (10) (at least two magnets horizontally and transversely aligned, to raise the layer), to superimpose a previous layer (a/b) over a subsequent one (b'/a'), in order that double layers in superimposition (a–a'/b–b') advance from this station;

a collecting station (2) of double layers (a–a'/b–b', 53) by means of:
   first transfer means (20) with a series of suspended rotatable electromagnets (21), (a horizontal row of at least two electromagnets transversely arranged, that co-operate with second lifting means (21) underlying the double layers (a–a'/b–b') in order to stick them to the first;

a packing station (3) involving a packing pocket (30) and lifting means (31) that can be lowered progressively to assist the deposition and formation of the package from the first transfer means (20–21). From the figures it is more clearly understood that while in the case of the plates (FIGS. 1–6) the operations normally proceed without overturning of the electromagnets (21), unlike, in the case of FIGS. 1' to 6', the said electromagnets rotate in order to allow the overturning.

The phases of FIGS. 1–6 are the following:

FIG. 1 shows formation of the double layer of bars b–b' by means of the electromagnetic lifting device (10).

Figure 2:
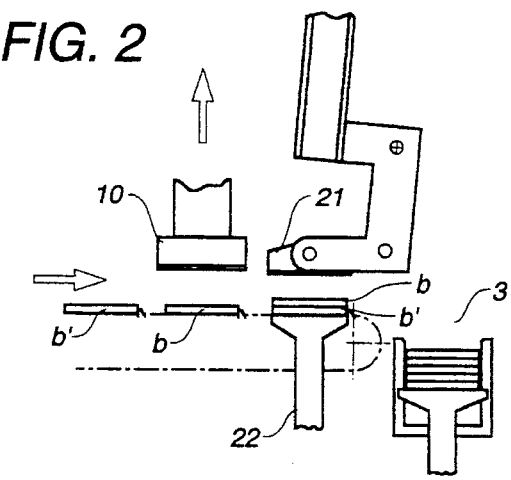

FIG. 2 shows the advancement of the rolling-mill stock.

Figure 3:
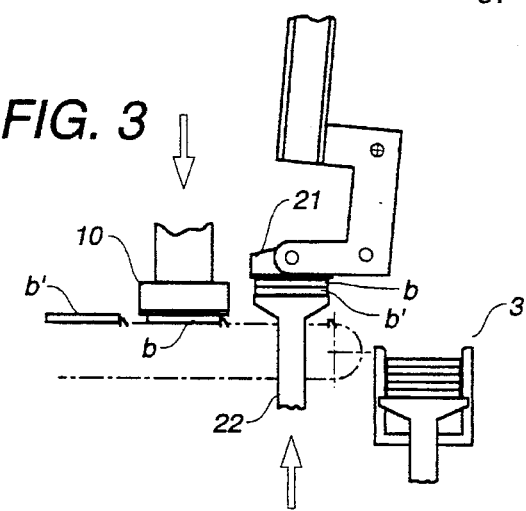

FIG. 3 shows the lowering of the double layer forming device (10) for the raising of the rolling-mill stock b and raising of the double layer of rolling-mill stock b–b' by the lifter (22) in order to fasten it below the suspended electromagnets (21).

Figure 4:
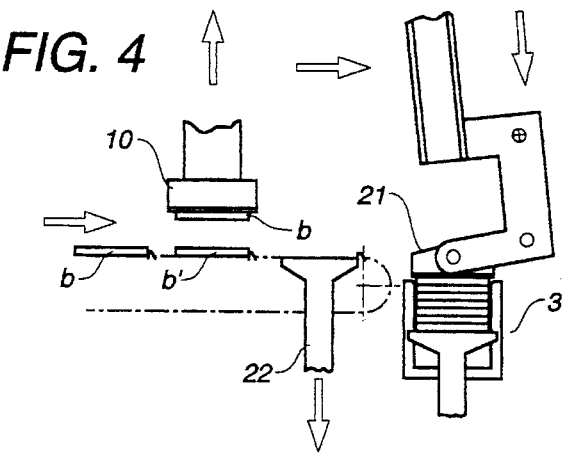

FIG. 4 shows the lowering of the lifter (21) below the advancement line (4) and advancement of the second layer of bars b', while the transfer means (20–21), transfers the double layer b–b' to the packing zone (3).

Figure 5:
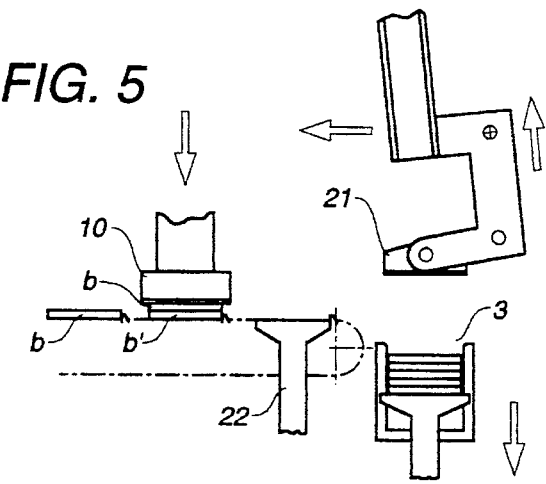

FIG. 5 shows the lowering of the first layer of bars b on top of the second layer of bars b' in the double layer formation zone (52).

Figure 6:
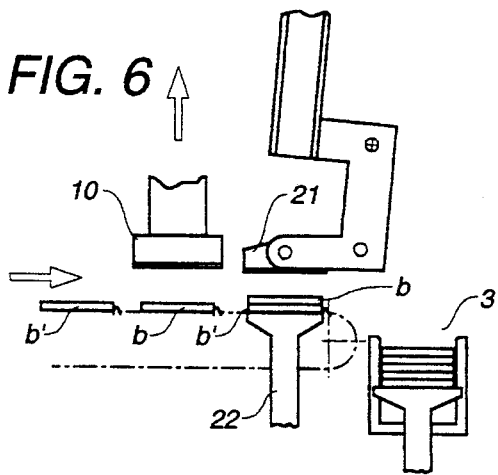
Figure 1:
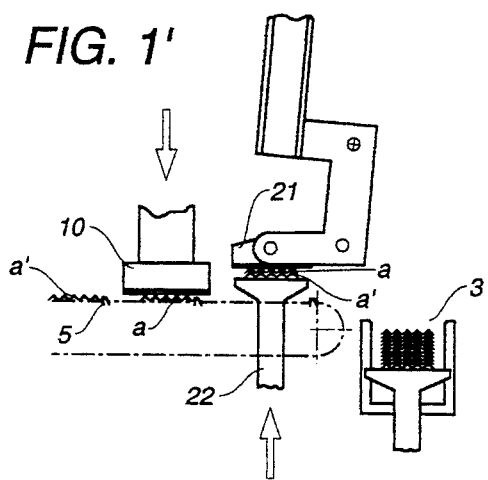
Figure 2:
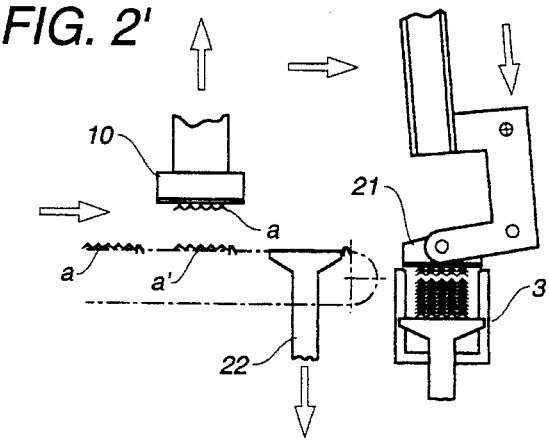
Figure 3:
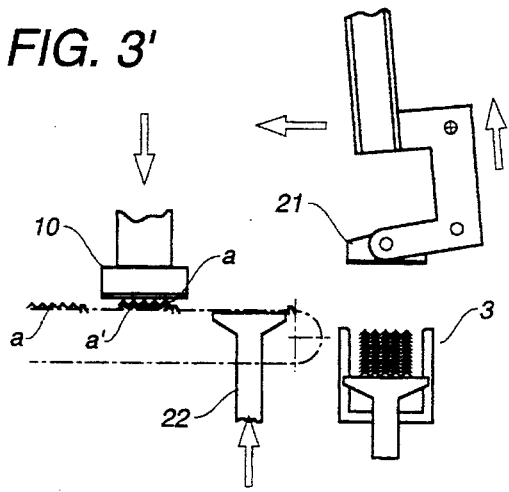
Figure 4:
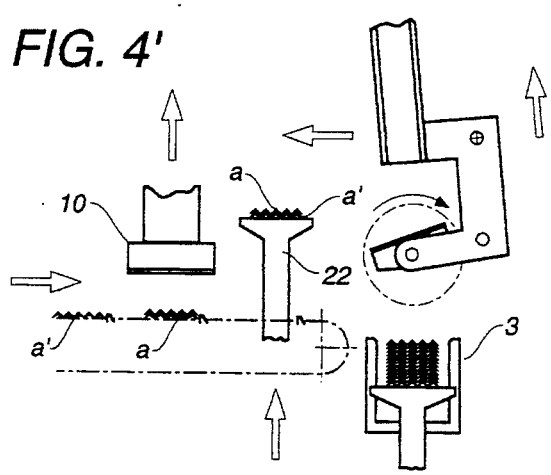
Figure 5:
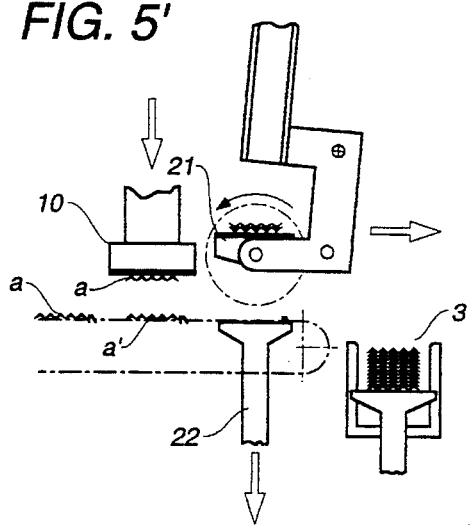
Figure 6:
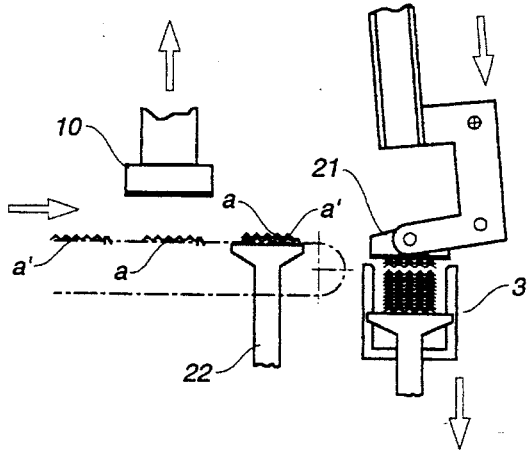

FIG. 6 shows the advancement of a new layer of bars b to the double layer formation zone and of the double layer b–b' in the collecting zone (2).

In FIGS. 1–6 only one flat rolling-mill stock is shown as an example, but it is clear that the number forming the layer may be that considered the most convenient (only one flat rolling-mill stock could be utilized for wide plates only).

In the case of the packing of angle section bars or "angulars", as is known for an efficient connection, one deposits one upright layer (Eg. three="n" bars) and one overturned layer eg. (e.g. two=n–1 bars) as is shown in FIGS. 1'–6'.

Obviously the number of bars may be that considered the most convenient. The use of three and two angulars (as shown in FIGS. 1'–6') are only examples of one situation in which the present invention is used.

In such a case in the zone of the formation of bar layers at the beginning (51), layers of "n" and "n–1" bars will be formed alternatively every two layers (solution however not limitative) according to known techniques, in order that the first double layer is formed by two layers of "n" bars and the second by two layers of "n–1" bars and so forth.

In particular the phases of the FIGS. 1'–6', with respect to the angulars are the following:

FIG. 1' shows that after having advanced a first layer of "n–1" angulars "a", there occurs a raising of a double layer of "n" angulars a–a' by means of the lifter (22).

FIG. 2' shows that after being raised the first layer of "n–1" angulars "a" by the lifter (10), the second layer of "n–1" angulars a' below advances while the transfer means (20–21) deposits the double layer of "n" angulars a–a' in the packer pocket (3).

FIG. 3' shows the deposition of the first layer of n–1 " angulars "a" on top of the second a' while the transfer means (20–21) returns to the starting position.

FIG. 4' shows that after advancement of a new layer of "n" angulars, a raising of the double layer of n–1 angulars a–a' and rotation in overturning of the magnets (21) for the collection from below the double layer.

FIG. 5' shows that after raising of the new layer of "n" angulars "a" an advancement of the new second layer a' and a contemporaneous rotation of 180° of the transfer magnets (21) and the transfer towards the packing zone.

FIG. 6' shows that after formation of a new double layer of "n" angulars, further advancement for the repetition of the cycle and deposition of the double layer of "n–1" angulars to the packing pocket in the packing zone (3).

Although the foregoing describes the formation of a double layer, nothing prevents the formation of a triple layer, or at any rate more layers, before transfer to the packing pocket.

I claim:

1. A process of operating a packing system for rolling-mill stock, the packing system having a continuous conveyor for advancing the rolling-mill stock, the packing system further including an overhead transfer suspended from above the conveyor, said overhead transfer having an electromagnet, a lifter is provided in operative association with the overhead transfer which removes the rolling-mill stock from the conveyor and raises the rolling-mill stock to a position above the conveyor to supply the electromagnet, the electromagnet being movable from a collecting position to a position above a collecting zone so that the electromagnet can place the rolling-mill stock in a packing pocket, the process comprising the steps of:

stopping an advancement of the conveyor such that a first rolling-mill stock resides directly below a magnetic collector and a multilayer rolling-mill stock resides below the overhead transfer and directly above the lifter, said multilayer rolling-mill stock being one layer overlying another layer;

raising the first rolling-mill stock by the magnetic collector from the conveyor;

lifting the multilayer rolling-mill stock by the lifter toward the electromagnet of the overhead transfer so that the electromagnet receives the multilayer rolling-mill stock;

lowering the lifter after the electromagnet has received the multilayer rolling-mill stock;

advancing the conveyor while the overhead transfer deposits the multilayer rolling-mill stock into the packing pocket;

stopping the advancement of the conveyor such that a second rolling-mill stock resides below the magnetic collector; and depositing the first rolling-mill stock from the magnetic collector onto the second rolling-mill stock while the overhead transfer returns to a position directly above the lifter.

2. The process of claim 1, said step of raising the first rolling-mill stock occurring generally simultaneously with said step of lifting the multilayer rolling-mill stock.

3. The process of claim 1, said first rolling-mill stock and said multilayer rolling-mill stock arranged so as to have a length dimension extending transversely to a direction of the advancement of the conveyor.

4. The process of claim 1, said rolling-mill stock being angular rolling-mill stock.

5. The process of claim 4, said step of depositing the multilayer rolling-mill stock into the packing pocket comprising the step of:

rotating the angular rolling-mill stock 180° from the orientation of a previously deposited angular rolling-mill stock.

6. The process of claim 5, the previously deposited angular rolling-mill stock being an equal multiple of layers as the rotated angular rolling-mill stock.

* * * * *